(12) United States Patent
Tabacchi

(10) Patent No.: US 7,832,854 B2
(45) Date of Patent: Nov. 16, 2010

(54) DEVICE FOR FIXING MOUNT MEMBERS TO SPECTACLE LENSES, AND SPECTACLES, PARTICULARLY OF THE TYPE DEVOID OF LENS-HOLDING RIMS, INCLUDING SAID FIXING DEVICE

(75) Inventor: Massimiliano Tabacchi, Padua (IT)

(73) Assignee: Safilo Societa Azionaria Frabbrica Italiana Lavorazione Occhiali S.p.A., Pieve Di Cadore BL (IT)

( * ) Notice: Subject to any disclaimer, the term of this patent is extended or adjusted under 35 U.S.C. 154(b) by 5 days.

(21) Appl. No.: 12/298,561

(22) PCT Filed: May 16, 2006

(86) PCT No.: PCT/IT2006/000364

§ 371 (c)(1),
(2), (4) Date: Oct. 27, 2008

(87) PCT Pub. No.: WO2007/132491

PCT Pub. Date: Nov. 22, 2007

(65) Prior Publication Data

US 2009/0073378 A1    Mar. 19, 2009

(51) Int. Cl.
*G02C 1/02*    (2006.01)
(52) U.S. Cl. ..................... 351/110; 351/124
(58) Field of Classification Search ............... 351/110, 351/41, 83, 86, 103, 106, 108, 109, 124
See application file for complete search history.

(56) References Cited

U.S. PATENT DOCUMENTS

| 5,367,344 | A | 11/1994 | Fuchs |
| 6,210,002 | B1 | 4/2001 | Tachibana |
| 6,682,192 | B2 * | 1/2004 | Conner ..................... 351/110 |
| 7,048,373 | B2 * | 5/2006 | Yamaguchi et al. ......... 351/110 |
| 7,059,716 | B2 * | 6/2006 | Spindelbalker ............. 351/110 |
| 2003/0058402 | A1 | 3/2003 | Conner |
| 2005/0128429 | A1 | 6/2005 | Spindelbalker |
| 2005/0275793 | A1 | 12/2005 | Yamaguchi et al. |

FOREIGN PATENT DOCUMENTS

WO        0233474   A1    4/2002

* cited by examiner

*Primary Examiner* — Hung X Dang
(74) *Attorney, Agent, or Firm* — Volpe and Koenig, PC

(57) ABSTRACT

A device for spectacles, such as a lug for the articulation of a spectacle arm or a central nasal support bridge, to a lens, the lens has a pair of holes for the locking of the mount member, has a pair of bush members rigidly connected to each other and has respective axial holes, there being provided in the mount member a pair of pin-type appendages capable of being inserted into the respective holes subject to the introduction of these latter into the corresponding lens holes, such that each bush member is interposed between an inner surface of the lens hole and a corresponding outer surface of appendage. Each pin-type appendage has localized protuberances that deform the corresponding coupling surface. The fixing device has at least one relief protruding from the outer wall of each appendage and extending on a helical course in the axial direction of the appendage.

16 Claims, 2 Drawing Sheets

_US 7,832,854 B2_

DEVICE FOR FIXING MOUNT MEMBERS TO SPECTACLE LENSES, AND SPECTACLES, PARTICULARLY OF THE TYPE DEVOID OF LENS-HOLDING RIMS, INCLUDING SAID FIXING DEVICE

Device for fixing mount members to spectacle lenses, and spectacles, particularly of the type devoid of lens-holding rims, including said fixing device

TECHNICAL FIELD

The present invention relates to a device for fixing spectacle mount members including the characteristics specified in the preamble of main claim 1. The invention is also aimed at spectacles including said fixing device that are produced according to claim 16.

TECHNOLOGICAL BACKGROUND

The invention applies particularly, but not exclusively, within the field of spectacles devoid of lens-holding rims, otherwise known by the term "rimless", in which mount members of different configuration are fixed directly to the lens of the spectacles. The term "mount member" is intended to include in the present context, for example, the articulation lugs for the arms of the spectacles or the nasal support bridge, extending to connect the lenses centrally.

In a first example of known fixing devices, provision is made for the lens to be fixed to the mount member by the insertion and locking of a pin-type appendage protruding from the mount member into a through hole provided in the lens, subject to a bush member being received in the hole and arranged so as to be interposed, when assembly has taken place, between the pin and the lens. The interposition of the bush member, typically made of plastics material, makes it possible to obtain adequate and stable coupling and also a greater and more uniform distribution of the clamping stresses between the surfaces of the mutually coupled lens and pin, especially in the presence of materials, such as those of the lens and the frame, having different mechanical characteristics. A solution of the aforesaid type is described in International Application WO 03/060595.

In a second example of known devices, provision is made for the mount member to comprise a pair of pin-type appendages standing up in the same direction from the aforesaid member and capable of engaging a respective pair of bush members, subject to these latter being received in corresponding holes passing through the lens. The provision in close position of the pair of appendages ensures the locking between the mount member and the lens, opposing any relative rotational movements in the use of the spectacles owing to possible accidental slackening of the locking forces between the pins and bushes. An example of a device having the aforesaid characteristics is known from US Patent Application No. 2005/0128429. According to this technical solution, provision is made for the pins to be equipped with annular projections, having a pointed configuration in cross-section, and capable of impinging on the inner surface of the bush for mutual coupling in order to guarantee, by means of localised deformation of the bush itself, the relative locking with same.

DESCRIPTION OF THE INVENTION

The principal aim of the invention is that of improving the mutual coupling between lens and frame of the aforesaid style, in particular in terms of improved distribution of the pressures generated in the coupling of each pin with the corresponding bush member, ensuring improved relative retention and a consequent reduction in the tensions induced on the lens by the locking device.

These and other aims which will become clearer hereinafter are achieved by a device having the characteristics defined in the attached claims.

BRIEF DESCRIPTION OF THE DRAWINGS

The characteristics and advantages of the invention will become clearer from the following detailed description of a preferred exemplary embodiment, illustrated by way of non-limiting example with reference to the appended drawings, in which.

PREFERRED WAY OF IMPLEMENTING THE INVENTION

Figure 1:
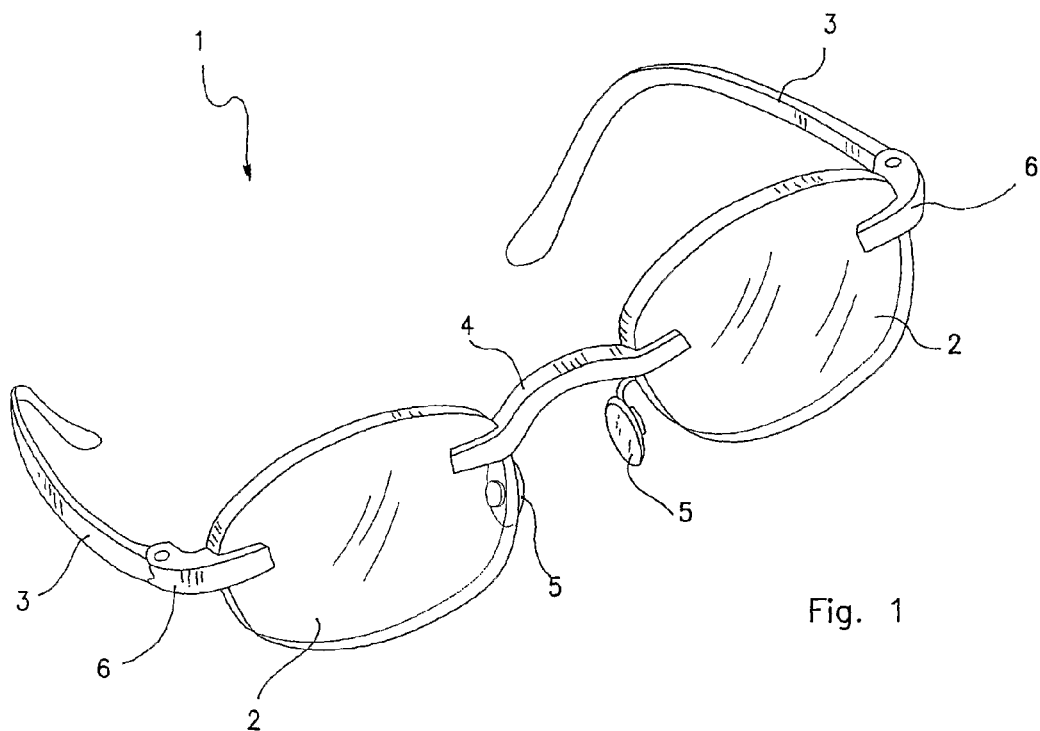
FIG. 1 is a perspective view of spectacles provided with devices for fixing the lenses to the mount members, produced according to the invention.

With initial reference to FIG. 1, the reference 1 indicates as a whole a pair of spectacles of the rimless type, or devoid of lens-holding rims, comprising respective lenses 2, articulation arms 3 and a central bridge 4 (for connection of the lenses) having respective nasal support pads 5.

At the end portion closest to the corresponding lens, each arm 3 is hinged to the lens by means of a hinge member 6, also known by the term "lug" in the specific technical field, a hinge pin and an eyelet provided at the end of the arm.

Hereinafter, for convenience of description, the lug 6 and bridge 4 of the spectacles are also referred to as a whole by the term "mount member", the present invention relating to the common device for fixing such members directly onto the lens of the spectacles, a device typically adopted in the field of spectacles devoid of lens-holding rims.

In particular, a description will be given of the fixing device for fixing the lug 6 to the lens 2, it being understood that an identical system distinguishes the connection of any one of the aforesaid mount members. In this regard, analogous details of such systems are distinguished by the same reference numbers.

Figure 2:
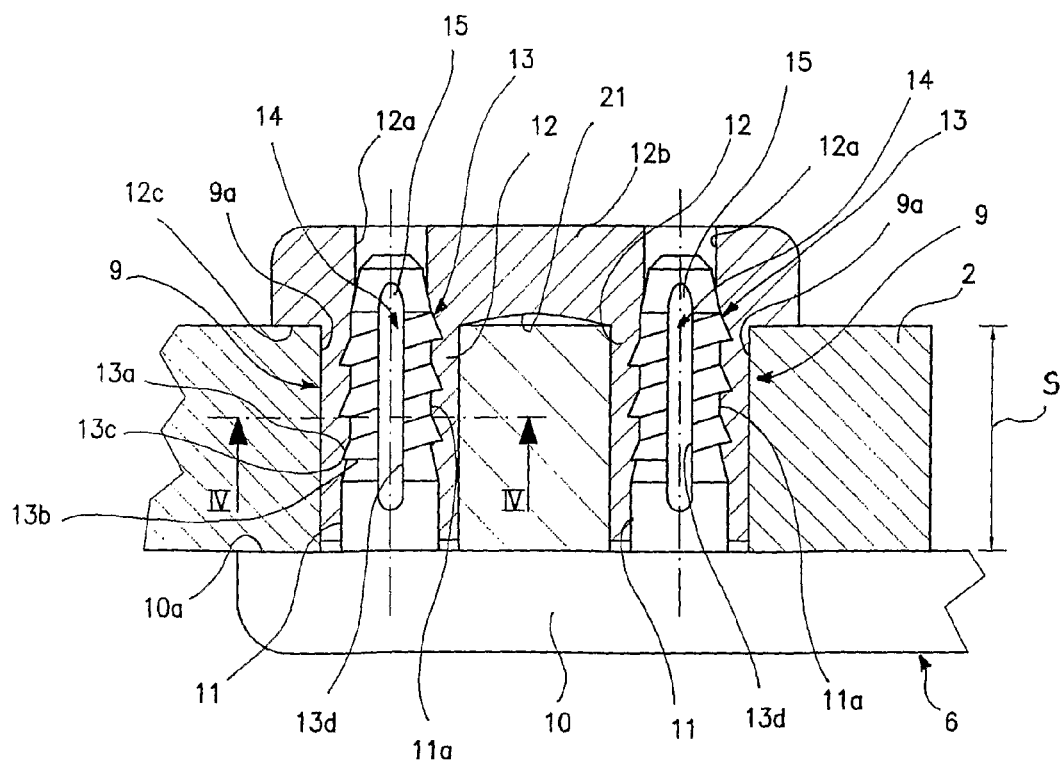
FIG. 2 is a view on an enlarged scale and in partial axial section of a detail of the fixing device for the lenses of FIG. 1.
Figure 3:
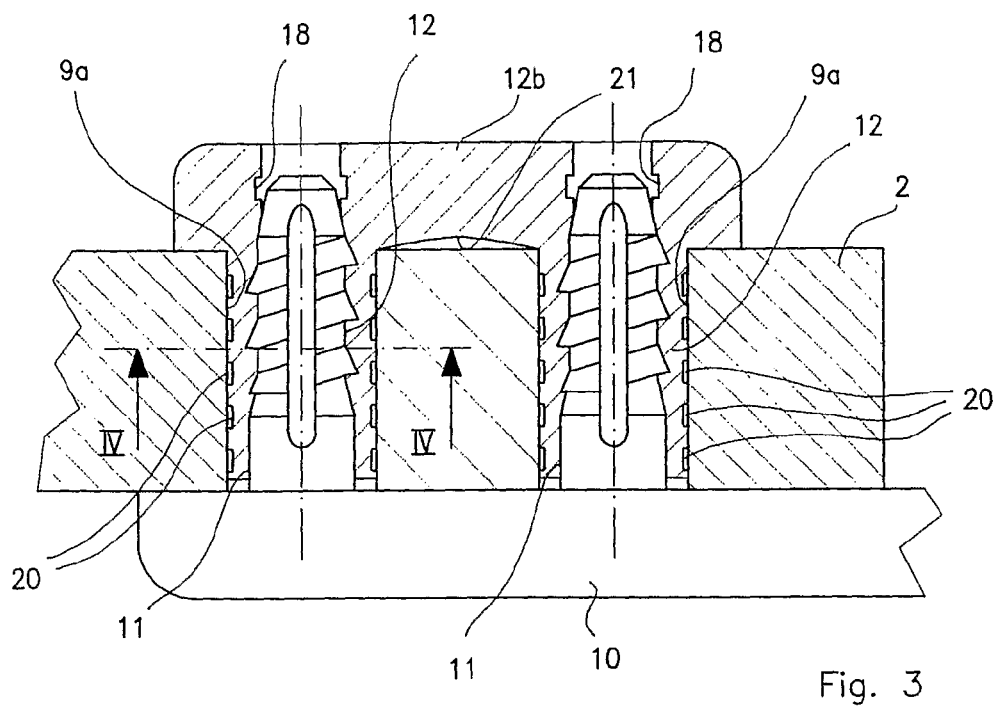
FIG. 3 is a view corresponding to that of FIG. 2 of an alternative embodiment of the fixing device of the preceding figures.

With reference to FIG. 2, for the aforesaid fixing each lens 2 is provided with a pair of through holes 9, with axes parallel and spaced, having a substantially cylindrical inner surface 9a, extending axially within the thickness S of the lens.

The lug 6 in turn comprises a portion 10 having a surface 10a for abutment against the corresponding lens surface and from which stand up a pair of pin-type appendages 11 capable of being inserted into the respective holes 9 of the lens. The pin-type appendages 11 conveniently extend in the same direction from the portion 10, in a spaced mutual relationship and also with respective directions of axial development that are parallel to one another. Preferably, the pin-type appendages 11 are made of metallic material, and are for example obtained in one piece with the lug or connected to same by soldering.

The pin-type appendages 11 are inserted into the respective holes 9 subject to the introduction into the holes themselves of a pair of respective bush members 12 axially pierced with the definition of corresponding through holes 12a intended to receive the pin-type appendages. It follows that each bush member 12 is interposed between the surface 9a of the corresponding hole 9 and a surface 11a defining the outer wall of each pin-type appendage 11. The bush members 12 are conveniently incorporated at one of their axial ends in a plate-like base 12b for mutual connection in which is defined a surface 12c for abutment against the lens surface. Preferably, the bush members 12 and the base 12b are made in one piece from plastics material.

According to a principal characteristic of the invention, each pin-type appendage 11 is provided with a respective running relief 13 protruding from the surface 11a of the outer wall and extending on a helical course in the axial direction of the pin-type appendage. The relief 13 has a substantially uniform radial projection from the outer wall and extends on the outer wall with a configuration which substantially recalls the helical development of the threads which characterize screws. As a result, owing to the helical course of the relief 13, the projection of same in a diametral plane of the pin-type appendage 11 exhibits a rectilinear profile inclined with respect to a plane perpendicular to the axis of the pin, as clearly illustrated in FIG. 2. The inclination of the profile has the advantage of allowing improved distribution of the pressure on the coupling surfaces of the bushes, with consequent reduction or elimination of the tensions transferred to the lens 2.

With reference to the same plane of projection recalled above, the projection of the protuberance of the relief 13 has a tooth-like configuration defined by a pair of rectilinear flanks 13a, 13b converging in a vertex region 13c.

The relief 13 of each pin-type appendage 11 is also interrupted along its helical length, said interruptions, designated by the reference 14, being defined by the intersection of the relief 13 with one or more grooves 15 extending axially in the outer wall of the pin-type appendage 11.

Figure 4:
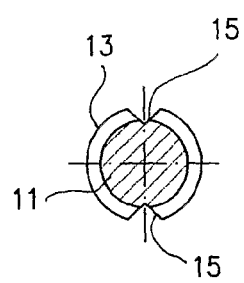
FIGS. 4, 5 and 6 are views in section along the line IV-IV of FIGS. 2 and 3 in three respective and distinct alternative embodiments of the sectional detail.

With reference to FIG. 4, two grooves 15 are provided, diametrically opposed and also extending, for an axial portion of the pin, parallel to the axis of same. Each groove 15 preferably has a cross-section, at the corresponding interruption 14, which is substantially V-shaped, as clearly emerges from FIG. 4. This configuration is such that the edges 13d of the relief 13, defined at the aforesaid interruptions, have a pointed profile capable of impinging on the surface of the bush 12 for relative retention between the coupled surfaces. In this way a relative gripping action between pin and bush, both in the axial and in the transverse direction, is further guaranteed.

Figure 5:
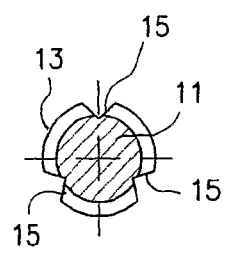

As an alternative, three grooves 15 may be provided, as illustrated in FIG. 5, these also extending for an axial portion of the pin-type appendage, parallel to one another and angularly spaced at 120° from one another.

Figure 6:
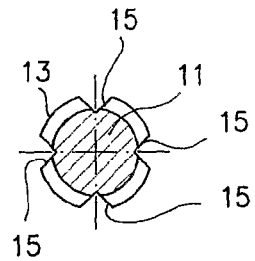

As a further alternative, four grooves 15 may be provided, extending parallel to the axis of the pin-type appendage and angularly spaced at 90° from one another, as illustrated in FIG. 6.

It is to be understood that the number of grooves provided on each pin-type appendage may be different still, and will in any case be selected according to specific requirements, since the grooves have the principal prerogative of inducing a reduction in the pressure, for the purpose of eliminating tensions on the lens, in order to avoid breakage of same as a result of the locking of the mount member.

Figure 7:
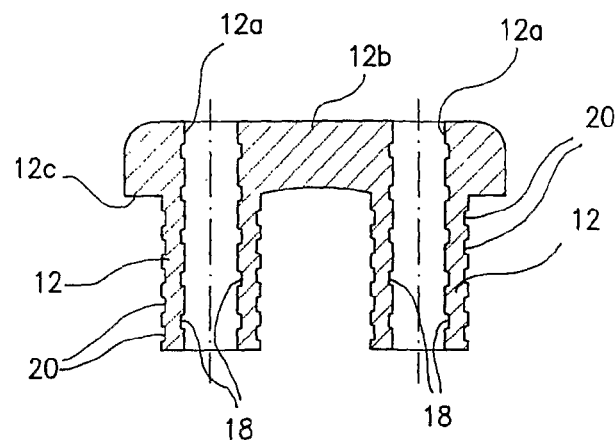
FIG. 7 is a view in axial section of a detail of the fixing device of FIG. 3.

With reference to FIG. 7, provision is further made for the through holes in the bush members 12 to have a plurality of annular channels 18 provided in the inner surface of said holes. The channels 18 are coaxial with the axis of the hole and are axially spaced from one another in the axial direction of the hole. The channels 18 of each bush 12 are capable of co-operating with the relief 13 of the corresponding pin-type appendage 11 so is as to increase the degree of relative retention between the coupled parts of the appendage and of the bush.

Provision is further made for the outer surfaces of each bush member 12 to have a corresponding plurality of channels 20. Similarly, these channels 20 are conveniently also coaxial with the axis of the hole in the bush 12 and are axially spaced from one another in the axial direction of the hole. These channels 20 are capable of co-operating with the inner surfaces of the through holes 9 in the lens, so as to increase the degree of relative retention between the coupled materials.

The reference 21 also indicates the surface profile of the base portion 12b extending between the bush members 12 and capable of being coupled to the lens 2. The aforesaid profile conveniently has a concave configuration, so as to facilitate the elastic deformation of the base 12b, in order to compensate for any inaccuracies in the values for distance between centres of the holes 9 provided in the lens.

For the fixing of the mount member to the lens, following the prior insertion of the bush members 12 into the corresponding holes 9 in the lens, the pin-type appendages 11 are pressed into coupling with the bushes by means of insertion into the respective through holes 12a of same, thus effecting the relative locking between the mount member and the corresponding lens.

The invention thus achieves the aims proposed, obtaining the advantages mentioned with respect to the known solutions.

A principal advantage lies in the improved level of grip obtainable with the fixing device of the invention, both between the pin-type appendages and the bush members, and between these latter and the lenses.

Another advantage lies in the improved distribution of the locking pressures that is obtainable owing to the oblique course of the profile of the relief protruding from the pin-type appendages, with consequent elimination of possible tensioning/breakage of the lens.

Yet another advantage lies in the improved capacity for incision of the relief with respect to the coupling surface of the bush, obtained owing to the provision of the interruptions of the relief, these latter guaranteeing at the same time a reduction in the pressure, which is of advantage for avoiding tensioning/breakage of the lens.

The invention claimed is:

1. A device for fixing a mount member for spectacles, having a lug for the articulation of a spectacle arm or a central nasal support bridge to a lens of said spectacles, said lens comprising at least one pair of holes for the locking of said mount member, the device comprising at least one pair of bush members rigidly connected to one another and provided with respective axial holes, there being provided in the mount member a pair of pin-type appendages capable of being inserted into the respective holes of the bush members subject to the introduction of these latter into the corresponding holes in the lens, so that each bush member is interposed between an inner surface of the respective hole in the lens and a corresponding outer surface of the respective pin-type appendage, each pin-type appendage having localized protuberances on the outer wall and capable of deforming the corresponding coupling surface of the bush member, characterized in that it comprises at least one relief protruding from the outer wall of each pin-type appendage and extending with a helical course in the axial direction of the corresponding pin-type appendage, wherein at least one of the bush members comprises a plurality of second annular channels provided in the outer surface of the bush member, said channels being coaxial with the axis of the pin-type appendage and mutually spaced from one another.

2. A device according to claim 1, wherein said helical relief has a plurality of interruptions along its helical length.

3. A device according to claim 2, wherein said plurality of interruptions is defined by the intersection of the helical relief with at least one groove extending axially in the outer wall of the respective pin-type appendage for at least a portion of the axial length of the appendage.

4. A device according to claim 3 wherein, on each pin-type appendage, at least two grooves are provided, extending axially in the outer wall of each pin-type appendage, said grooves being diametrically opposed and extending parallel to the axis of the pin-type appendage.

5. A device according to claim 3 wherein, on each pin-type appendage, three grooves are provided, extending parallel to the axis of the pin-type appendage and angularly spaced at 120° to one another.

6. A device according to claim 3 wherein, on each pin-type appendage, four grooves are provided, extending parallel to the axis of the pin-type appendage and angularly spaced at 90° to one another.

7. A device according to claim 3, wherein said grooves have a cross-section of V-shaped configuration at the corresponding interruption.

8. A device according to claim 7, wherein said relief, in axial section, has a toothed configuration defined by a pair of rectilinear flanks converging in a vertex region.

9. A device according to claim 1, wherein at least one of the bush members comprises a plurality of first annular channels provided in the inner surface of the through hole in the bush, said channels being coaxial with the axis of the appendage and mutually spaced from one another.

10. A device according to claim 1, wherein the holes in each of said bushes are through holes.

11. A device according to claim 1, wherein said bush members are incorporated at one of their ends in a plate-like base, the portion of said base defined between said bushes having a surface with concave profile.

12. A device according to claim 1, wherein said pin-type appendages are made of metallic material.

13. A device according to claim 1, wherein said pin-type appendages are made of plastics material.

14. A device according to claim 1, wherein said bush members are produced in one piece with the plate-like base for mutual connection.

15. A device according to claim 14, wherein said bush members are made of plastics material.

16. Spectacles comprising at least one lens provided with at least one pair of holes for the locking of a mount member, an articulation lug or a central nasal support bridge, and a device for fixing said mount member to said at least one lens according to claim 1.

* * * * *